L E RANSOM'S
IMPROVEMENT in BRICK-MACHINES.

PATENTED FEB 4 1868

No. 74000

ATTEST
Samuel Wells
J H Swarthout

INVEN'
Loomis ?

United States Patent Office.

LOOMIS E. RANSOM, OF TRENTON, MICHIGAN.

Letters Patent No. 74,000, dated February 4, 1868.

---

IMPROVED BRICK-MACHINE.

---

The Schedule referred to in these Letters Patent and making part of the same.

---

Know all men that I, LOOMIS E. RANSOM, of Trenton, in the county of Wayne, and State of Michigan, have invented a new and useful Improvement in an Apparatus for Spreading Tempered Clay on a Plane; and I do declare that the following is a true and accurate description thereof, reference being had to the accompanying drawings, and to the letters of reference marked thereon, and being a part of this specification.

On the 21st day of March, A. D. 1855, a patent was issued to me for an "Improvement in the Manufacture of Bricks," in which I claim the manufacture of bricks by first spreading the tempered mortar or clay at once upon the ground.

The object of this invention is to so construct an apparatus by which the tempered clay can be evenly spread upon the surface of the yard, preparatory to being cut up into bricks, tile, or any other desired form by the method substantially as described in my patent heretofore referred to.

In order to accomplish this end, I construct a proper frame, A, supported upon proper wheels, for carrying the apparatus, which may be propelled by any suitable power or method. To this frame A, I attach, by means of suitable journals and bearings, the rollers B C, provided at one or both ends with suitable gears, which mesh into each other, and to which motion is communicated by the crank D and gear E, or by any other proper device. The gears upon the ends of the rollers B and C are lettered F, and, in giving motion to the rollers, of course turn them towards each other. The roller B is provided with flanges, which form a recess upon the roller between them, of the necessary depth to spread the tempered clay the thickness required. These flanges should be of sufficient size, also, that their lower faces will be in line, or nearly so, with the wheels or rollers upon which the apparatus is carried, and propel it. Upon the inner sides of the frame I place the sides or shields G, fitted upon their lower edges to the periphery of the rollers B and C. H is a sloping shelf or slide, to conduct the tempered clay into the hopper formed by the rollers B and C, and the shields G. I is a proper scraper, attached to the frame A, and fitting into the recess in the roller B, for the purpose of preventing the tempered clay from clinging to the face of that roller, and forcing it to lie in ribbons on the ground.

All the points shown and described above are fully delineated in Figure 1 of the drawings.

Figure 1:
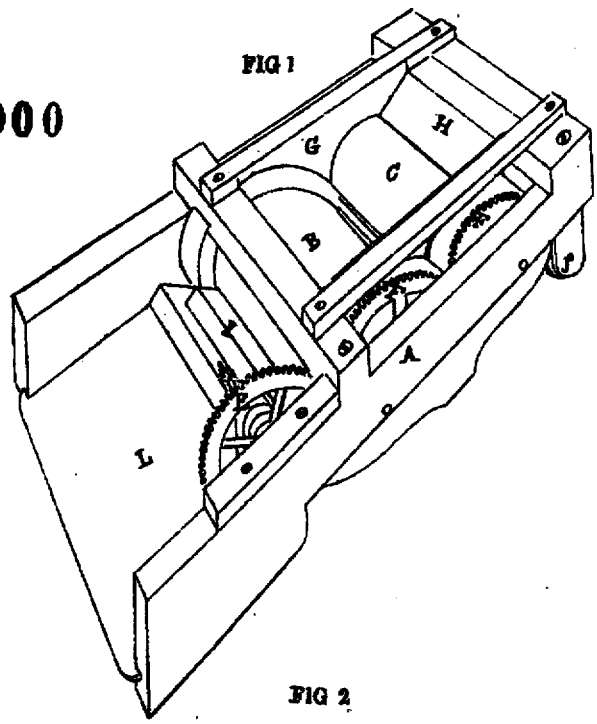
Figure 2:
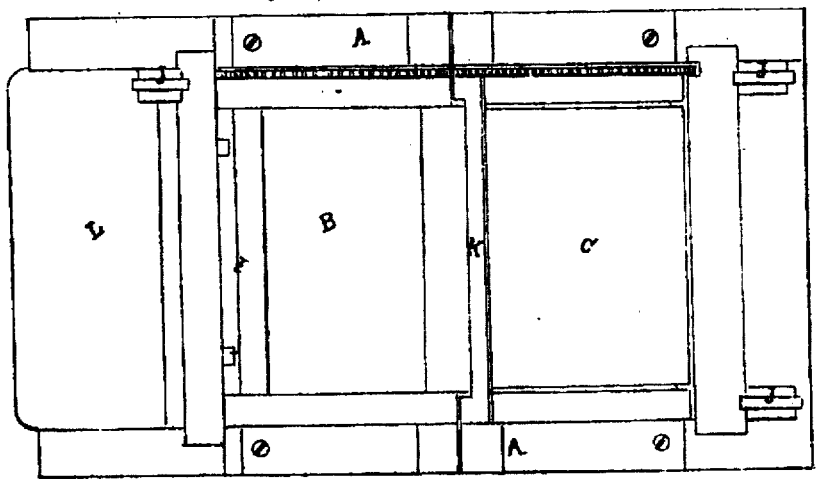
Figure 2 is a plan view of the bottom of my apparatus, and the same letters indicate like parts in each figure.

J are wheels, placed under the apparatus for the purpose of sustaining and carrying the machine. I shows the scraper, and K is a knife, which prevents the tempered clay from sticking to the surface of the roller C, and turns it into the recess formed in the roller B. These points are shown in fig. 2, and L in both figures indicates the platform upon which the operator stands. The scraper I should be attached to the frame A, so that it can be adjusted, as may be desired, by set-screws or otherwise.

Figure 3:
Figure 3 is a sketch of the float, hereinafter described.

We will suppose the plane of a yard to be ready for operation, and to receive the ribbons of tempered clay, and our apparatus ready for work. I then fill the hopper with tempered clay, and drive the apparatus across the yard, when a ribbon of tempered clay will be spread the width of the recess in the roller B, and of the desired thickness. Should there be any cavities in the ribbon, a little tempered clay may be thrown therein by hand, sufficient to fill them up. Then I take the float, made substantially in the form as shown in fig. 3, and dropping the flanges M of the float on either side of the ribbon, pass the float over it, by which means the ribbon is smoothed over, and nicely polished. After the ribbon has arrived, by evaporation of a portion of the water in the clay, at a proper consistency, I cut it up into the desired form by the means described in my patent already mentioned, or in any other desired way. Before using the float, as hereinbefore described, I sprinkle the ribbon or ribbons with water.

What I claim as my invention, and desire to secure by Letters Patent, is—

The construction of the apparatus as hereinbefore described, combining the frame A, the rollers B and C, the crank D, the gears E and F, the sides or shields G, the sloping shelf H, the scraper I, the wheels J, and the knife K, with the stand L, all arranged and operating substantially as and for the purposes herein described.

LOOMIS E. RANSOM.

Witnesses:
SAMUEL WELLS,
J. H. SWARTWOUT.